US010356381B2

(12) United States Patent
Kiyosawa

(10) Patent No.: US 10,356,381 B2
(45) Date of Patent: Jul. 16, 2019

(54) IMAGE OUTPUT APPARATUS, CONTROL METHOD, IMAGE PICKUP APPARATUS, AND STORAGE MEDIUM

(71) Applicant: CANON KABUSHIKI KAISHA, Tokyo (JP)

(72) Inventor: Kazuyoshi Kiyosawa, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 134 days.

(21) Appl. No.: 15/096,828

(22) Filed: Apr. 12, 2016

(65) Prior Publication Data
US 2016/0309142 A1 Oct. 20, 2016

(30) Foreign Application Priority Data

Apr. 15, 2015 (JP) ................. 2015-083229

(51) Int. Cl.
H04N 13/00 (2018.01)
H04N 13/111 (2018.01)

(52) U.S. Cl.
CPC ... *H04N 13/111* (2018.05); *H04N 2013/0081* (2013.01); *H04N 2213/003* (2013.01)

(58) Field of Classification Search
CPC ....... H04N 13/0011; H04N 2013/0081; H04N 2013/003; H04N 13/111; H04N 13/239;
(Continued)

(56) References Cited

U.S. PATENT DOCUMENTS 6,445,833 B1 * 9/2002 Murata ............... H04N 13/167
382/285
2002/0028014 A1 * 3/2002 Ono .................... H04N 13/296
382/154
(Continued)

FOREIGN PATENT DOCUMENTS

JP 2001238231 A 8/2001
JP 2010-191925 A 9/2010
(Continued)

OTHER PUBLICATIONS

Japanese Office Action dated Oct. 30, 2018 in corresponding Japanese Patent Application No. 2015083229 with English translation.

*Primary Examiner* — Marnie A Matt
(74) *Attorney, Agent, or Firm* — Carter, DeLuca & Farrell LLP

(57) ABSTRACT

An image output apparatus includes an image signal processing unit configured to perform image processing on acquired image data and a depth information generation unit configured to generate information regarding a depth direction related to an image. A three-dimensional image data generation unit generates three-dimensional image data based on depth information and the image data subjected to the image processing. A system control unit associates the image data subjected to the image processing by the image signal processing unit with the depth information generated by the depth information generation unit and performs control such that the three-dimensional image data generation unit is caused to generate the three-dimensional image data using the depth information changed according to the image data before and after the image processing.

26 Claims, 10 Drawing Sheets

(58) Field of Classification Search
CPC .. H04N 5/2628; H04N 13/106; H04N 13/128; H04N 13/133; G06T 7/194
USPC .......................................................... 348/44
See application file for complete search history.

(56) References Cited

U.S. PATENT DOCUMENTS

| | | | |
|---|---|---|---|
| 2010/0014781 A1* | 1/2010 | Liu .................... | H04N 13/0022 382/285 |
| 2011/0090307 A1* | 4/2011 | Marvie ................... | G06T 15/20 348/43 |
| 2012/0086775 A1* | 4/2012 | Bae ...................... | H04N 13/261 348/46 |
| 2012/0281905 A1* | 11/2012 | Cheng ................... | G06T 7/0081 382/154 |
| 2013/0106837 A1* | 5/2013 | Mukherjee ............ | G06T 7/0065 345/419 |
| 2015/0009286 A1* | 1/2015 | Omori ................... | G06T 3/4007 348/42 |
| 2015/0269737 A1* | 9/2015 | Lam .................. | H04N 13/0011 382/154 |

FOREIGN PATENT DOCUMENTS

| | | | |
|---|---|---|---|
| JP | 2013-126763 A | 6/2013 | |
| JP | 2014090252 A | 5/2014 | |

* cited by examiner

IMAGE OUTPUT APPARATUS, CONTROL METHOD, IMAGE PICKUP APPARATUS, AND STORAGE MEDIUM

BACKGROUND OF THE INVENTION

Field of the Invention

The present invention relates to a technology for outputting three-dimensional image data based on image data and depth information.

Description of the Related Art

Three-dimensional (3D) printers which have recently started to spread are apparatuses that form three-dimensional shapes by stacking recording materials such as resin or plaster power or the like. Apparatuses or systems that output photographed images as three-dimensional reliefs, that is, three-dimensional images, based on the photographed images and depth information regarding the photographed images using the 3D printers have been provided. Japanese Patent Application No. 2013-126763 discloses a technology for generating three-dimensional image data using information for performing 3D processing. The information includes color difference information of an image, density difference information of an image, distance information to a subject, face recognition information, focus adjustment information, movable region information, etc. One or a plurality of pieces of this information is used. Japanese Patent Application No. 2010-191925 discloses a technology for performing a printing process by configuring setting of regions or the degree of uplift or depth according to specifications desired by a user when emboss printing, 3D relief printing, or the like is performed.

On the other hand, among image pickup apparatuses such as digital cameras, there are apparatuses that have functions of setting special effects at the time of photographing by users. For example, there is a process of applying an effect of blurring of a background image or a diorama-like (miniature form) image by performing a blurring process on a partial region of an image. There is also a process of applying a special effect resembling photography with a fisheye lens by performing a distortion process on an image.

Incidentally, when three-dimensional images are output from images subjected to special effect processing, it is necessary to output the three-dimensional images reflecting the special effects. In the three-dimensional image data generation process disclosed in Japanese Patent Application No. 2013-126763, unevenness can be generated using a photographing condition or an image analysis result at the time of the photographing. However, the unevenness according to an image at the time of photographing is generated at most and a relief for which a special effect is further emphasized may not be output. In the three-dimensional image data generation disclosed in Japanese Patent Application No. 2010-191925, it is assumed that a region is set by a user. Therefore, a region desired to be emphasized in an image subjected to a special effect may not automatically be set.

SUMMARY OF THE INVENTION

The present invention provides an image output apparatus that enables reflecting an image processing effect based on an image subjected to image processing and outputting a three-dimensional image or information for generating the three-dimensional image.

According to an aspect of the present invention, an image output apparatus acquires two-dimensional image data and depth information regarding the image data and generates and outputs three-dimensional image data. The image output apparatus comprises: an image processing unit configured to perform image processing on the image data; a generation unit configured to generate the three-dimensional image data from the image data subjected to the image processing by the image processing unit and the depth information; and a control unit configured to perform change the depth information according to the image processing performed by the image processing unit and perform control so that the generation unit generates the three-dimensional image data by using the changed depth information.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. In the embodiments, examples in which an image output apparatus processing three-dimensional image data is applied to an image pickup apparatus will be described.

First Embodiment

An example of a configuration applied to a digital camera will be described as example 1 according to a first embodiment of the present invention. In addition, the configuration can be applied to, for example, any information processing terminal or any image pickup apparatus such as a personal computer, a mobile phone, a smartphone, a PDA, a tablet terminal, and a digital video camera. A three-dimensional image generation process corresponding to the embodiment of the present invention may be performed to prepare a photographed image and distance information regarding a subject included in the photographed image. Therefore, a three-dimensional image generation apparatus may not have a photographing function and a distance measurement function as long as related information can be obtained. In this case, the configuration may be applied to an output apparatus such as a 3D printer that outputs a three-dimensional image based on an input of an image photographed in the outside and the distance information or a program on a computer.

Figure 1A:
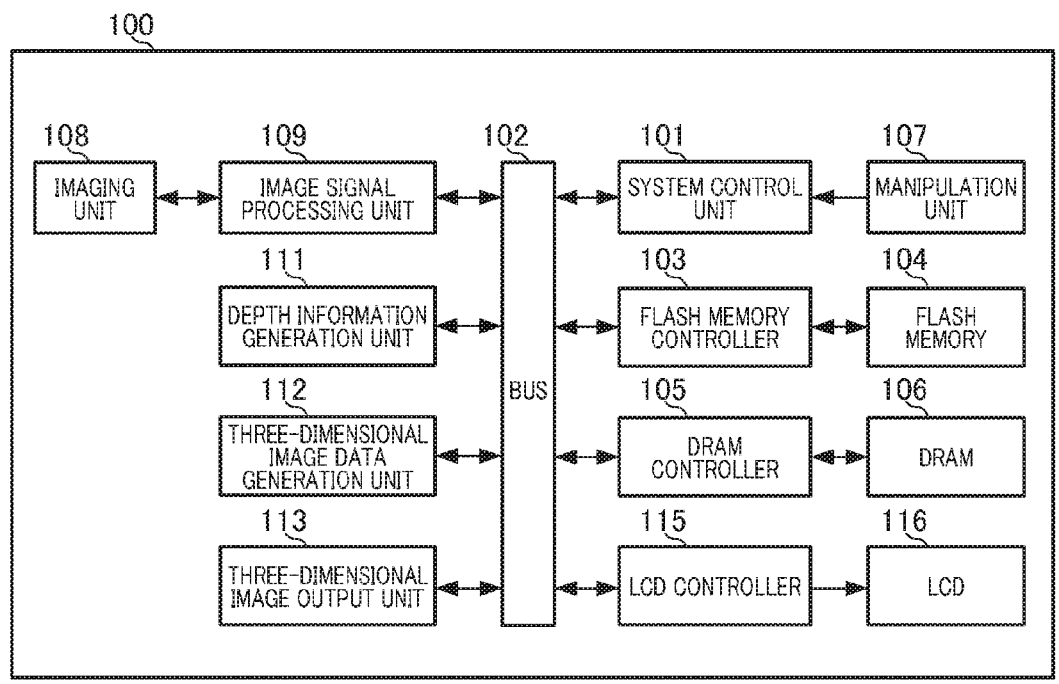
FIGS. 1A to 1C are block diagrams illustrating an example of the configuration of an image pickup apparatus according to an embodiment of the present invention.

FIG. 1A is a block diagram illustrating an example of the configuration of a digital camera having a three-dimensional image data output function. Each block may be configured as hardware using a dedicated logic circuit or a memory. Alternatively, each block may be configured as software by causing a central processing unit (CPU) such as a computer to execute a processing program stored in a memory. Hereinafter, positional relations will be described with a side facing a subject defined as a front side, a side closer to a camera as a near side, and a side moving away from the camera as a rear side.

A camera body unit 100 of the digital camera has a function of outputting three-dimensional image data and includes an imaging unit 108 and processing units connected to an internal bus 102. The internal bus 102 connects the processing units. A system control unit 101 includes an arithmetic unit such as a CPU and controls each processing unit connected by the internal bus 102.

A flash memory controller 103 controls reading and writing of nonvolatile data on a flash memory 104 based on a control instruction from the system control unit 101. In the embodiment, the flash memory 104 is an example of a recording medium. The system control unit 101 operates based on a program stored in the flash memory 104 and instructs the flash memory controller 103 to perform control such that the nonvolatile data such as photographed image data is stored in the flash memory 104. A dynamic random access memory (DRAM) controller 105 controls reading and writing of data on the DRAM 106 based on a request from each processing unit. The system control unit 101 and the processing units store transient data or the like from an operation in the DRAM 106 for use.

A manipulation unit 107 includes a button installed on an external portion of the camera body unit 100 of the digital camera or a switch detecting a manipulation of the button. When a user manipulates the button or the like, the manipulation unit 107 outputs an instruction signal according to the manipulation to the system control unit 101.

Figure 1B:
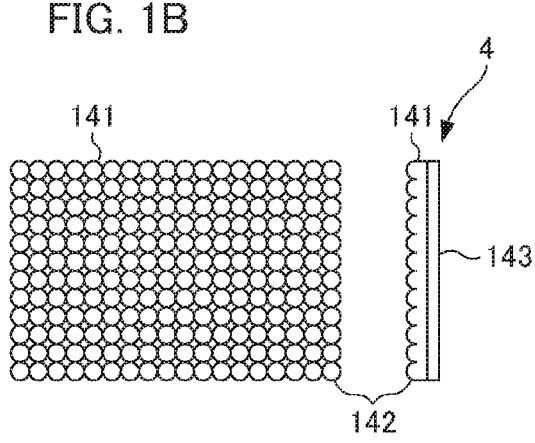
Figure 1C:
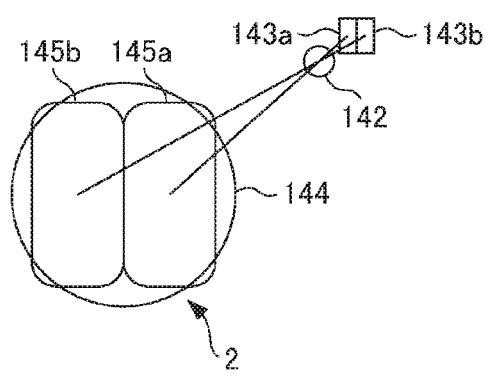

The imaging unit 108 that images a subject includes an imaging element. The imaging unit 108 is configured to include an imaging optical system including a lens that captures an optical image of a subject and an image sensor such as a charge-coupled device (CCD) or a complementary metal-oxide semiconductor (CMOS) element converting the optical image into an electric signal. The imaging unit 108 according to the embodiment can acquire a plurality of parallax images by photographing once (in one exposure). Various apparatuses typified by multi-lens cameras such as stereo cameras are known as such a camera. In the embodiment, a microlens array (hereinafter referred to as an MLA) in which an imaging element divides an exit pupil of an imaging lens on a light reception surface is provided. FIG. 1B schematically illustrates a state when an imaging element 4 is viewed from a front surface side and a lateral side of the camera body unit 100. The MLA 141 is formed on the light reception surface of a pixel group 143 included by the imaging element 4. Each of the pixels that form the pixel group 143 is configured to include one microlens 142 and two photodiodes (photoelectric conversion regions) 143a and 143b, as illustrated in FIG. 1C. FIG. 1C conceptually illustrates an exit pupil 144 of the imaging lens 2. An A pixel 143a and an A image pupil 145a which is a first pupil region, and a B pixel 143b and a B image pupil 145b which is a second pupil region have a conjugate relation through each microlens 142. Accordingly, each of the pixels of the imaging element 4 has a pupil division function. A light flux passing through the A image pupil 145a which is the right half of the exit pupil 144 is incident on the A pixel 143a and a light flux passing through the B image pupil 145b which is the left half of the exit pupil 144 is incident on the B pixel 143b. An image formed from an output of an A pixel group and an image formed from an output of a B pixel group are parallax images. By detecting a phase difference between the plurality of parallax images obtained with the imaging element 4, a distribution (a distance map or a defocus map) of distance information (depth information) of a subject can be obtained based on a defocus amount between the pixel data output from the plurality of pixels. Each parallax image or an added image obtained by adding the parallax images can be used as two-dimensional information (image data) regarding the subject. In the embodiment, focus detection is performed using the imaging unit 108 and an image signal processing unit 109 for such a configuration.

The image signal processing unit 109 acquires an image signal from the imaging unit 108 and performs signal processing. The image signal processing unit 109 controls the imaging unit 108 based on an instruction of the system control unit 101 to perform a process of storing image data obtained after a subject photographing operation in the DRAM 106. The image signal processing unit 109 performs a process of storing a defocus amount measured by the imaging unit 108 at the time of photographing in the DRAM 106 along with the image data. The image signal processing unit 109 performs a process of applying special effect processing to the image data and storing the processed data in the DRAM 106. The special effect processing is, for example, a contrast enhancement process, a blurring process, a distortion process of deforming an image, or a coordinate conversion process. In addition, the image signal processing unit 109 performs a process of contracting the image data to display data and storing the display image in a display frame memory provided in the DRAM 106.

A depth information generation unit 111 performs a process of generating distance map data for each region of an image based on the image data and the defocus amount stored in the DRAM 106 in accordance with a known method and storing the distance map data in the DRAM 106. A three-dimensional image data generation unit 112 generates three-dimensional image data based on the image data stored in the DRAM 106, the distance map data generated by the depth information generation unit 111, and the image data subjected to the special effect processing by the image signal processing unit 109. At this time, the three-dimensional image data generation unit 112 performs a process of generating three-dimensional image data according to a control instruction of the system control unit 101 and storing the generated three-dimensional image data in the DRAM 106. The data format of a three-dimensional image is, for example, a format such as a standard triangle language (STL) or a virtual reality modeling language (VRML). Since each format is a known format, the detailed description thereof will be omitted.

A three-dimensional image output unit 113 outputs the three-dimensional image data stored in the DRAM 106, for example, the three-dimensional image data with the format of the STL or the VRML described above, to the outside. A user connects an external apparatus such as a 3D printer to the camera body unit 100 as an output destination apparatus so that the output three-dimensional image data can be materialized. A liquid crystal display (LCD) controller 115 reads data of the display frame memory stored in the DRAM 106 and performs control such that an image is displayed on the LCD 116 according to display content of the data. A display unit using the LCD 116 is merely an example and any display device may be used.

Figure 2:
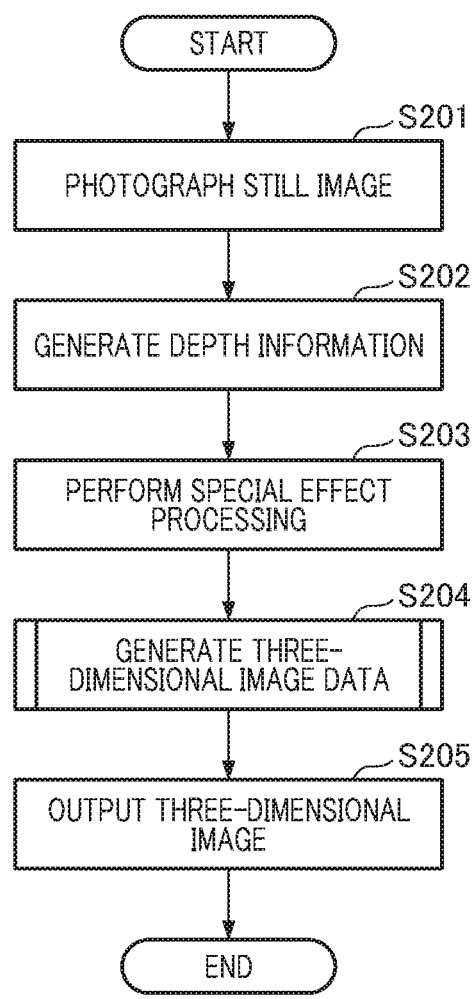
FIG. 2 is a flowchart illustrating an operation of the image pickup apparatus according to the embodiment of the present invention.

Next, a process according to the embodiment will be described with reference to FIG. 2. FIG. 2 is a flowchart for describing an example of the process when a still image is photographed with the digital camera illustrated in FIGS. 1A to 1C and a three-dimensional image is output. The following process is realized when the system control unit 101 in FIG. 1A reads a program from the memory and executes the program.

In S201, the imaging unit 108 photographs a subject and stores data of a photographed image and a defocus amount in the DRAM 106 under the control of the system control unit 101. In S202, the depth information generation unit 111 generates the distance map data for each region of the image based on the data of the image and the defocus amount stored in the DRAM 106. The distance map data is stored as depth information in the DRAM 106.

In S203, the image signal processing unit 109 performs the special effect processing on the photographed image data acquired in S201 according to an instruction of the system control unit 101. The image data after the special effect processing is stored in the DRAM 106. For example, a contrast enhancement process of obtaining an effect in which sharpness (a sense of contrast) is applied to an image will be described with reference to FIG. 3.

Figure 3:
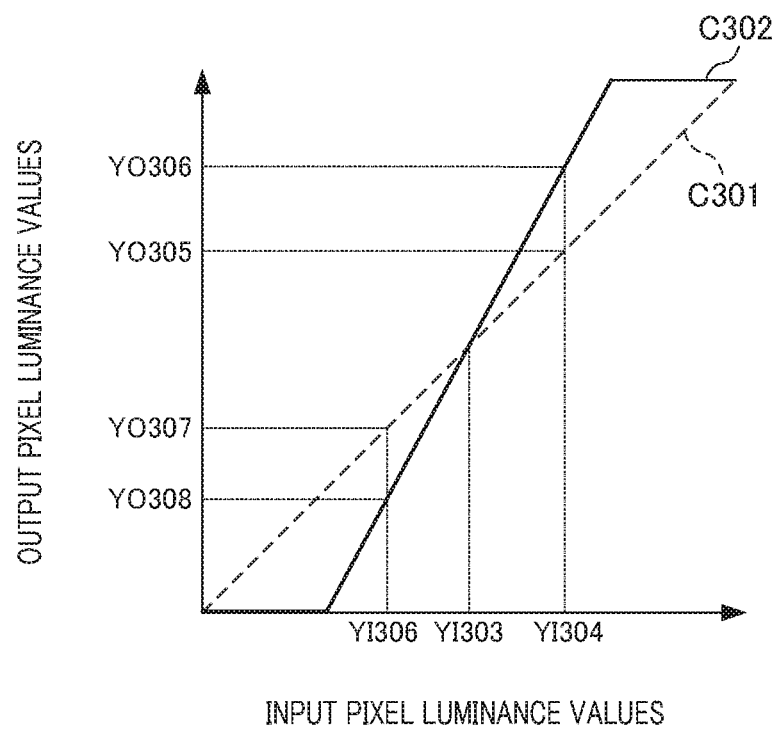
FIG. 3 is a diagram illustrating input and output luminance value characteristics of contrast enhancement according to a first embodiment.

FIG. 3 illustrates an example of the conversion of the input and output luminance value characteristics before and after the contrast enhancement process. The horizontal axis represents luminance values of input pixels. Luminance values YI306, YI303, and YI304 satisfy a relation of "YI1306<YI303<YI304." The vertical axis represents luminance values of output pixels. Luminance values YO305 to YO308 satisfy a relation of "YO308<YO307<YO305<YO306." A dotted graph line C301 indicates characteristics of input and output luminance values and a solid graph line C302 indicates characteristics of input and output luminance values of the photographed image after the contrast enhancement process. In the process exemplified in FIG. 3, the output pixel luminance value to the input pixel luminance value is changed from the graph line C301 to the graph line C302, so that a process of enhancement of the contrast of an image is performed.

In step S204, the three-dimensional image data generation unit 112 or the system control unit 101 changes the depth information stored in the DRAM 106 based on the process content of the special effect processing in S203 under the control of the system control unit 101. Based on the depth information, the three-dimensional image data generation unit 112 generates the three-dimensional image data of a photographed image. Data of a photographed image that is a target of processing (hereinafter referred to as a target image) is stored in the DRAM 106 and subjected to the special effect processing. The details of the process of generating the three-dimensional image data will be described below with reference to FIG. 4.

After the process of S204, the process proceeds to S205. Then, the three-dimensional image output unit 113 performs a process of forming the photographed image subjected to the special effect processing as a three-dimensional image and outputs data of the generated three-dimensional image in a predetermined format such as the STL, as described above. By outputting the recorded three-dimensional image data to an external 3D printer or the like, it is possible to materialize the three-dimensional image data. Apart from the outputting of the three-dimensional image data, the changed distance information (depth information) and the image data subjected to the image processing may be output and recorded in association therewith.

Figure 4:
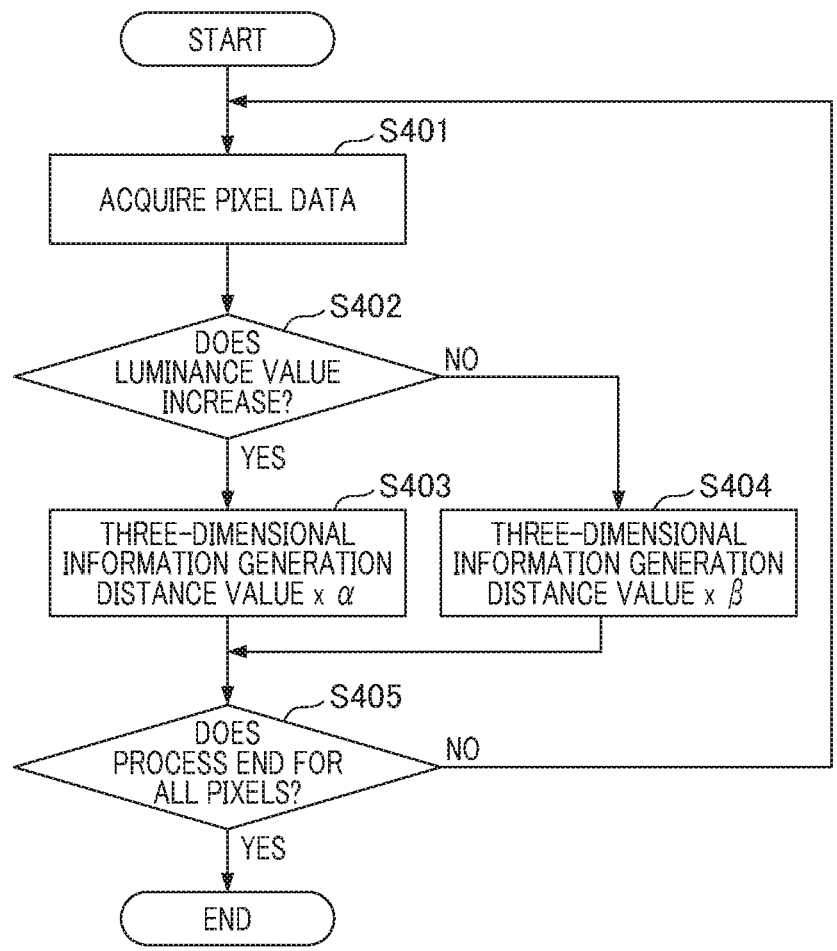
FIG. 4 is a flowchart illustrating a three-dimensional image data generation process according to the first embodiment.

Next, the three-dimensional image data generation process described in S204 of FIG. 2 will be described in detail with reference to the flowchart of FIG. 4. The following process is performed by the three-dimensional image data generation unit 112 under the control of the system control unit 101.

In S401, the three-dimensional image data generation unit 112 acquires pixel data according to the content of the image processing on each of the pixels sequentially selected in the target image in accordance with an instruction of the system control unit 101. Further, the three-dimensional image data generation unit 112 acquires a distance value corresponding to the pixel position of the target image from the depth information stored in the DRAM 106. Here, the distance value is assumed to be a value which is positive toward the near side using the rearmost side in a depth direction as a reference in the data of the distance map related to the target image. In contrast to this example, a distance value which is positive toward the rear side using a distance on the nearest side as a reference in the target image may be used.

Step S402 is a process of determining whether the luminance value of the pixel acquired in S401 is relatively increased or relatively decreased through the contrast enhancement process. The description will be made specifically with reference to the conversion example of FIG. 3. In FIG. 3, the luminance value of an input pixel is assumed to be YI303 at an intersection of the graph line C301 and the graph line C302. The pixel with an output pixel luminance value which is relatively higher than the luminance value indicated by the graph line C301 when YI303 is a reference is a pixel with a luminance value which becomes higher than a luminance value at the time of photographing through the contrast enhancement process. For example, the pixel with the output pixel luminance value YO306 higher than YO305 at the input pixel luminance value YI304 is a pixel with a luminance value which is higher than the luminance value at the time of photographing through the contrast enhancement process. In contrast, the pixel with an output pixel luminance value which is relatively lower than the luminance value indicated by the graph line C301 when YI303 is a reference is a pixel with a luminance value which becomes lower than the luminance value at the time of photographing through the contrast enhancement process. For example, the pixel with the output pixel luminance value YO308 which is lower than YO307 at the input pixel luminance value YI306 is a pixel with a luminance value which becomes lower than the luminance value at the time of photographing through the contrast enhancement process.

When the luminance value of the pixel is determined to be relatively higher through the contrast enhancement process in S402, the process proceeds to S403. Conversely, when the luminance value of the pixel is determined to be relatively lower, the process proceeds to step S404. In S403, a process of changing the depth information is performed on the distance value of the pixel acquired in S401 so that assignment in the depth direction is greater. In the case of the conversion example of FIG. 3, the output pixel luminance value on the graph line C301 at the input pixel luminance value YI304 is YO305 and the output pixel luminance value on the graph line C302 at the input pixel luminance value YI304 is YO306. In this case, a new distance value is calculated from the following calculation expression:

distance value×(YO306/YO305).

The calculated distance value is stored as the depth information in the DRAM 106. Here, the value (YO306/YO305) by which the distance value is multiplied is defined as a depth information generation coefficient (hereinafter simply referred to as a generation coefficient) α. That is, α>1 is satisfied in this example.

In S404, a process of changing the depth information is performed on the distance value of the pixel acquired in S401 so that assignment in the depth direction is less. In the case of the conversion example of FIG. 3, the output pixel luminance value on the graph line C301 at the input pixel luminance value YI306 is YO307 and the output pixel luminance value on the graph line C302 at the input pixel luminance value YI306 is YO308. In this case, a new distance value is calculated from the following calculation expression:

distance value×(YO308/YO307).

The calculated distance value is stored as the depth information in the DRAM 106. Here, the value (YO308/YO307) by which the distance value is multiplied is defined as a depth information generation coefficient (hereinafter simply referred to as a generation coefficient) β. That is, β<1 is satisfied in this example. After S403 or S404, the process proceeds to S405.

In S405, the three-dimensional image data generation unit 112 determines whether the process is performed on all of the pixels related to the target image. When the process is not completed for all of the pixels, the process returns to S401 and the process is repeated. When the process is completed for all of the pixels, the process of generating the three-dimensional image data ends.

In the embodiment, the depth information regarding the image is associated with the image data subjected to the image processing, and the process of generating and outputting the three-dimensional image data using the depth information changed according to the image data before and after the image processing is performed. According to the embodiment, when the three-dimensional expression is performed with the contrast enhancement process performed on the photographed image as the special effect processing, the special effect is reflected as in the case of processing for planar expression and the three-dimensional image can be output. Even when there is a restriction on the depth direction, the apparatus outputting the three-dimensional image performs the process of causing an assignment amount to be great in the depth direction of a region desired to be enhanced. Accordingly, the three-dimensional expression can be efficiently performed in relation to an image effect by the special effect processing within a range of a restriction.

In the embodiment, the example in which the original distance value is multiplied by the ratios of the luminance values before and after the contrast enhancement process as the generation coefficients α and β at the input pixel luminance values has been described. In this case, the relation of "α>β" may be satisfied so that the contrast enhancement effect is reflected in the depth direction. For example, the depth information may be changed using another method of setting the values of generation coefficients as fixed values. When the depth information is changed based on information regarding the contrast enhancement process, a difference between the maximum and minimum values of the distance value may be changed from a difference between both values before the change in some cases. In this case, a process of matching the differences before and after the change is performed through a normalization process. In the embodiment, the process of generating the distance map based on the defocus amount in each region obtained from the camera has been described. The present invention is not limited thereto, but the distance map may be generated using a method of using parallax images obtained by an imaging system with a binocular configuration or a method of detecting a region at each focal distance from data of a plurality of images photographed at different focal distances. The change, the addition, or the like of such processes is the same as that of the following embodiments.

In the embodiment, the image data before and after the image processing has been analyzed and the depth information to each pixel has been changed based on the analysis result, but the present invention is not limited thereto. That is, when the process content of image processing (special effect) applied to the image data is known in advance, the degree of change in the depth information resulting from such image processing may be regulated. More specifically, in step S402 of FIG. 4, information regarding the image processing applied to the image data may be acquired, branching is performed based on the acquired information regarding the image processing, and the depth information may be changed. The change, the addition, or the like of such processes is the same as that of the following embodiments.

Second Embodiment

Next, a second embodiment of the present invention will be described. In the embodiment, an example of a so-called diorama-like (miniature form) effect will be described as special effect processing. The special effect processing is image processing of setting a region on which a blurring process is performed and a resolution region on which the blurring process is not performed in the photographed image. In the embodiment, the configuration of a digital camera according to the embodiment is the same as the configuration illustrated in FIGS. 1A to 1C. Accordingly, hereinafter, reference numerals used above are given to the same constituent elements as those of the first embodiment and the detailed description thereof will be omitted. Differences will be mainly described. The description omission method is the same in the following embodiments.

Figure 6:
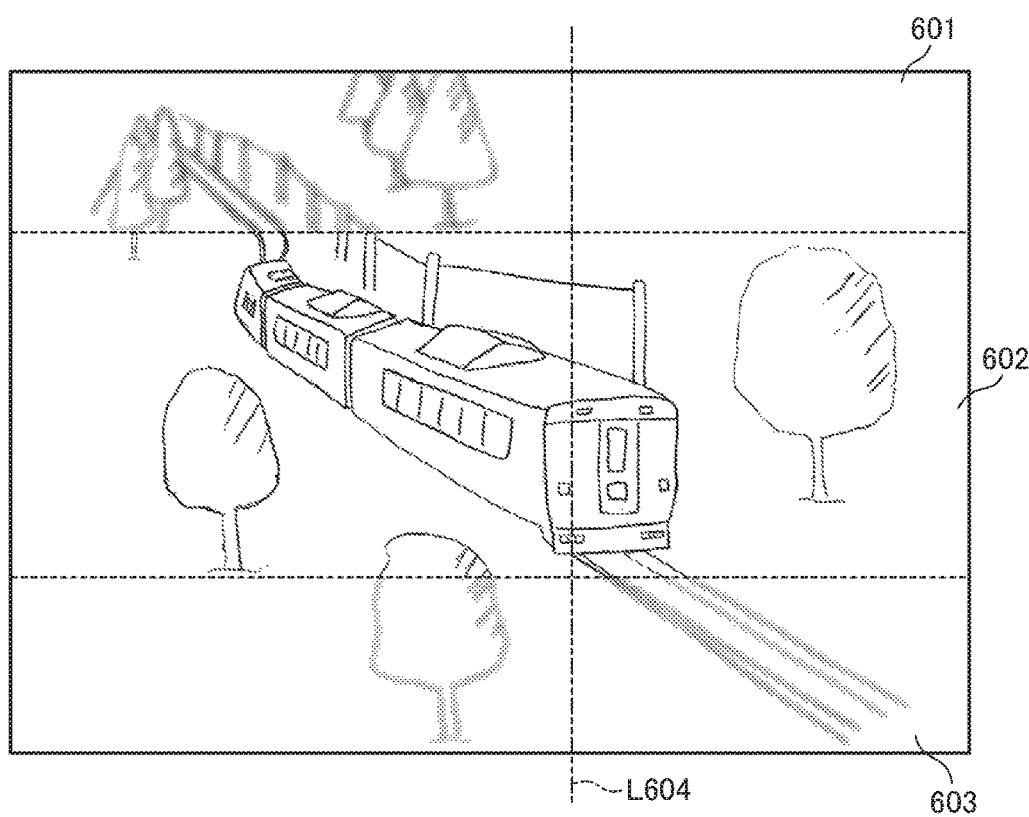
FIG. 6 is a diagram illustrating an example of an image subjected to diorama-like special effect processing according to the second embodiment.

In the embodiment, a process of photographing a still image with the digital camera illustrated in FIGS. 1A to 1C and outputting a three-dimensional image will be described with reference to FIG. 2. In the embodiment, in S203, the image signal processing unit 109 performs the diorama-like special effect processing on the photographed image acquired in S201 based on an instruction of the system control unit 101. That is, a region on which the blurring process is performed and a region on which the blurring process is not performed are set in the photographed image. FIG. 6 illustrates an example of an image on which the diorama-like special effect processing is performed. In the example of the image in FIG. 6, three regions 601, 602, and 603 are formed in the image. The regions 601 and 603 are located above and below the region 602, respectively, and are regions on which the blurring process is performed. The blurring process is performed in accordance with a known method such as a lowpass filter process or a process of contracting an image once and expanding the image again. In contrast, the region 602 is a resolution region, that is, the original photographed image with no change. In this way, a diorama-like effect can be obtained through a process of generating an image in which a sense of resolution remains at the center of the image in a state in which the upper and lower sides of the image are blurred.

In S204 of FIG. 2, the three-dimensional image data generation unit 112 generates three-dimensional image data. In S205, the process of outputting the three-dimensional image is performed.

Next, the three-dimensional image data generation process described in S204 will be described in detail with reference to FIG. 5.

In S501, the three-dimensional image data generation unit 112 acquires pixel data of each of the pixels sequentially selected in the target image based on an instruction of the system control unit 101. In this case, the target image is an image obtained by performing the diorama-like special effect processing on the photographed image stored in the DRAM 106. Further, the three-dimensional image data generation unit 112 acquires a distance value corresponding to the pixel position from the depth information stored in the DRAM 106.

In S502, it is determined whether the pixels acquired in S501 are the pixels on which the blurring process is not performed or the pixels on which the blurring process is performed. When the pixels are the pixels on which the blurring process is not performed, the process proceeds to S503. When the pixels are pixels on which the blurring process is performed, the process proceeds to S504.

In S503, the three-dimensional image data generation unit 112 or the system control unit 101 performs the process of changing the depth information on the distance value of the pixels acquired in S501 so that assignment in the depth direction is greater. For example, the three-dimensional image data generation unit 112 sets the distance value as a new distance value using 1.2 as the value of the generation coefficient $\alpha$:

distance value×$\alpha$.

This distance value is stored as the depth information in the DRAM 106.

In S504, the three-dimensional image data generation unit 112 or the system control unit 101 performs the process of changing the depth information on the distance value of the pixels acquired in S501 so that assignment in the depth direction is less. For example, the three-dimensional image data generation unit 112 sets the distance value as a new distance value using 0.8 as the value of the generation coefficient $\beta$:

distance value×$\beta$.

This distance value is stored as the depth information in the DRAM 106.

Figure 5:
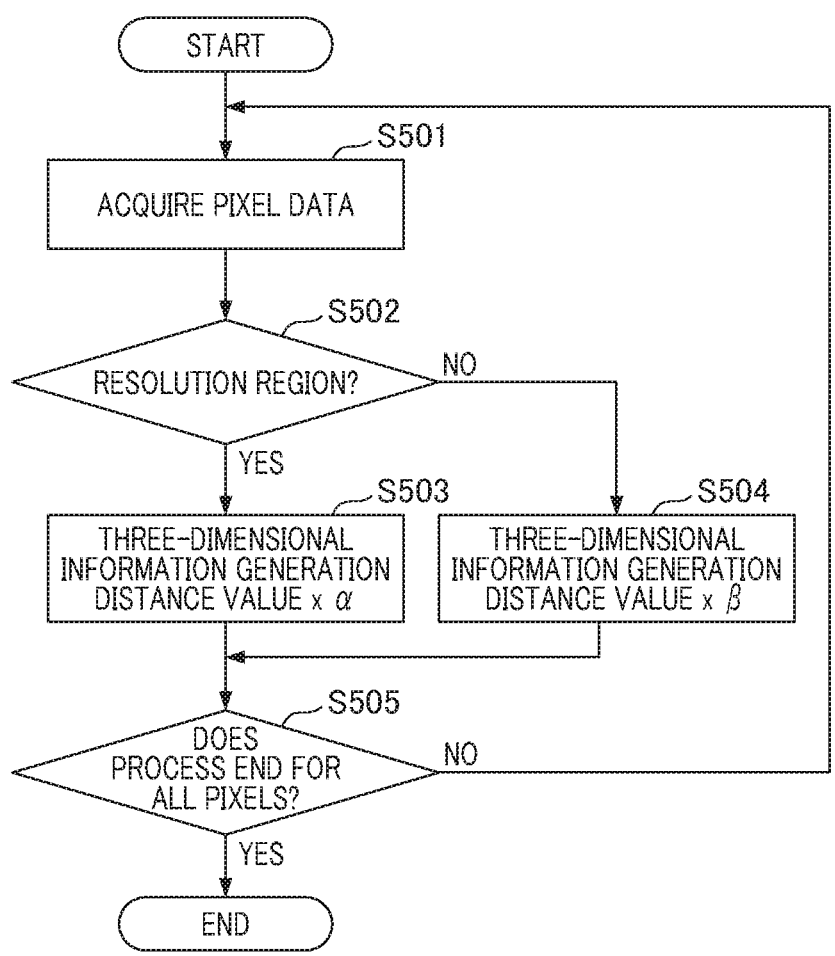
FIG. 5 is a flowchart illustrating a three-dimensional image data generation process according to a second embodiment.
Figure 7A:
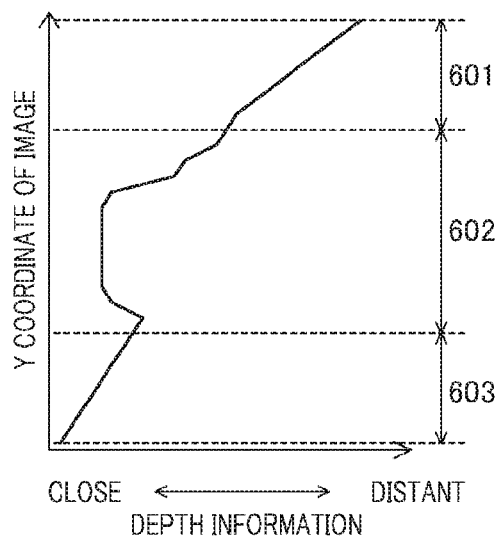
FIGS. 7A and 7B are diagrams illustrating an example of a relation between depth information and coordinates of an image according to the second embodiment.
Figure 7B:
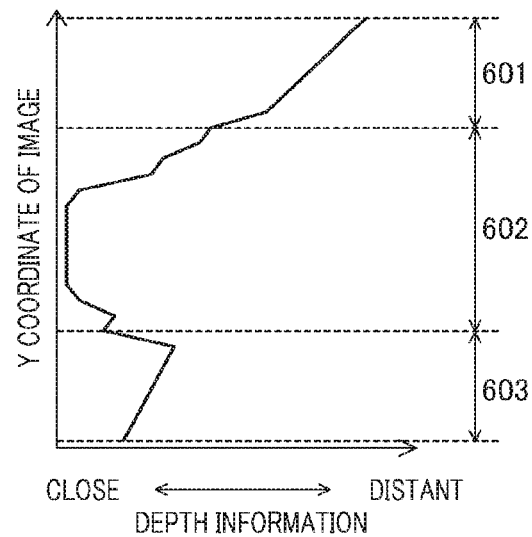

FIGS. 7A and 7B illustrate examples when the depth information is changed in S502 and S503 of FIG. 5. The horizontal axis of FIG. 7 represents a value indicated by the depth information. The vertical axis represents a Y coordinate value indicated by a vertical line L604 at a certain X coordinate value in the image exemplified in FIG. 6. FIG. 7A illustrates a relation between the depth information and the Y coordinate before the state in which the depth information is changed in S503 and S504. FIG. 7B illustrates a relation between the depth information and the Y coordinate after the depth information is changed. From FIG. 7B, it can be understood that the assignment in the depth information is greater in the resolution region 602, compared to FIG. 7A, on which the blurring process is not performed.

In S505 of FIG. 5, it is determined whether the process is performed on all of the pixels of the target image. When the process is not completed for all of the pixels, the process returns to S501 and the process is repeated. When the process is completed for all of the pixels, the process of generating the three-dimensional image data ends.

According to the embodiment, when the three-dimensional expression is performed through the image processing (the diorama-like special effect processing) of setting the region on which the blurring process is performed and the region on which the blurring process is not performed in the target image, the effect is reflected like in the planar expression and the three-dimensional image can be output. Even when there is the restriction on the depth direction in the apparatus outputting the three-dimensional image, the special effect can be efficiently expressed three-dimensionally within the range of the restriction by setting the assignment amount in the depth direction to be greater in relation to the resolution image on which the blurring process is not performed.

In the embodiment, the values of the generation coefficients $\alpha$ and $\beta$ have been defined as fixed values. The present invention is not limited thereto. The depth information may be changed using another method so that the assignment in the depth direction is greater in relation to the resolution region on which the blurring process is not performed as long as the relation of "$\alpha > \beta$" is satisfied. In order to further improve the diorama-like effect, the degree of the blurring process (a blurring amount) may be changed at a plurality of stages in each image region. In this case, the generation coefficients are switched in each image region, the values of the generation coefficients are set to be smaller in the image region in which the degree of the blurring process is stronger, and the depth information is changed.

Third Embodiment

Next, a third embodiment of the present invention will be described. In the embodiment, an example of a fisheye-lens-like effect will be described. This special effect processing is a process of applying an effect in which photographing is performed with a fisheye lens to a target image by deforming and distorting an image.

A process of outputting a three-dimensional image according to the embodiment will be described with reference to FIG. 2.

Figure 9:
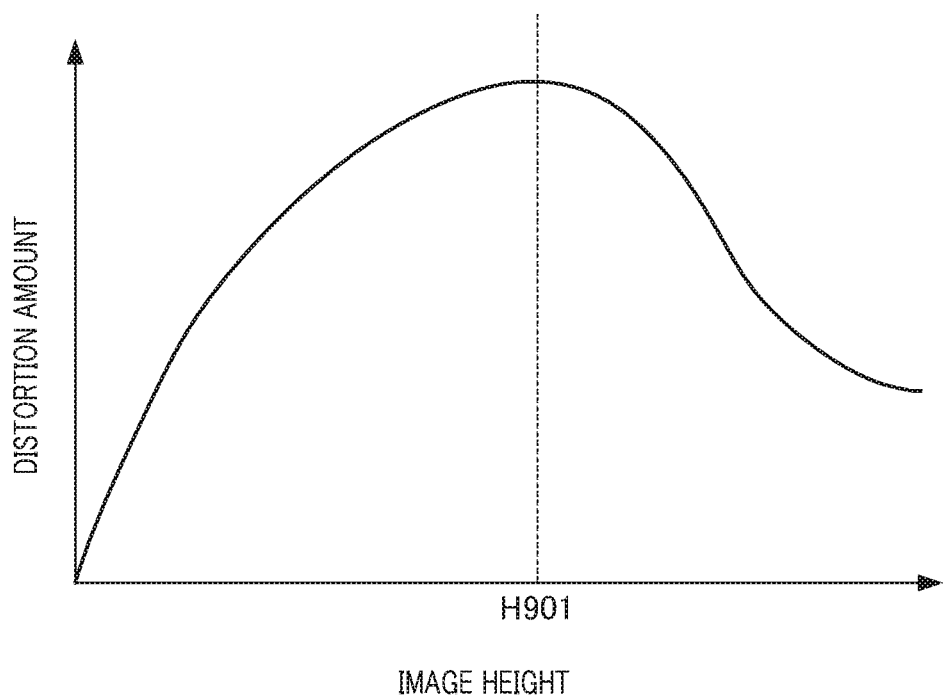
FIG. 9 is a diagram illustrating an example of a curve subjected to a distortion process as distortion amount characteristics according to the third embodiment.

In S203, the image signal processing unit 109 performs fisheye-lens-like special effect processing by performing a distortion process on the entire photographed image acquired in S201 in an image height direction based on an instruction of the system control unit 101. The distortion process will be described with reference to FIG. 9. FIG. 9 illustrates an example of a curved line related to the distortion process in regard to distortion amount characteristics in which the fisheye-lens-like effect is applied by performing the distortion process in the image height direction. The axis in the horizontal direction represents an image height value and the axis in the vertical direction represents a distortion amount indicating a change in a pixel movement amount of input or output in the image height direction. A coordinate conversion process of moving the positions of the pixels while a distortion amount in the image height direction is changed concentrically outward from the center of an image is performed.

Figure 10:
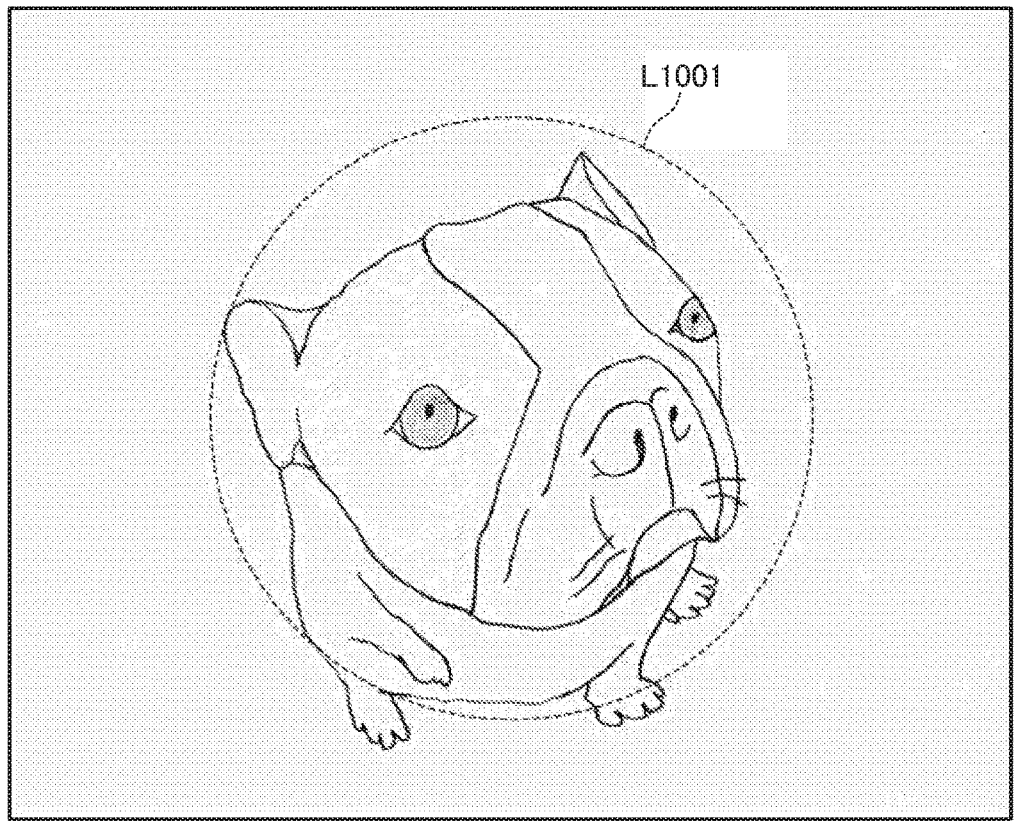
FIG. 10 is a diagram illustrating an example of an image subjected to fisheye-lens-like special effect processing according to the third embodiment.

FIG. 10 illustrates an example of an image on which the fisheye-lens-like special effect processing is performed. By performing the distortion process of the distortion amount characteristics described in FIG. 9 on the photographed image, it is possible to obtain the effect in which photographing is performed with a fisheye lens, as indicated in an image portion within a dotted range L1001.

Figure 11:
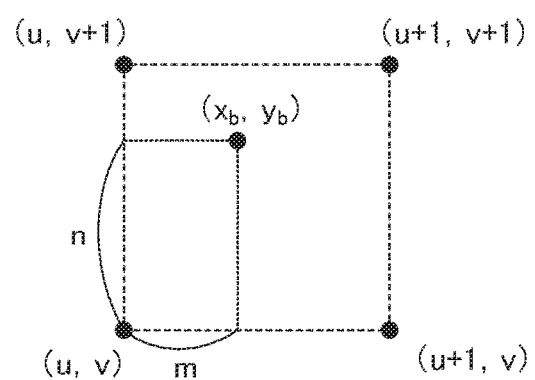
FIG. 11 is a diagram illustrating linear interpolation when coordinate conversion is performed through a distortion process according to the third embodiment.

Next, the coordinate conversion process of moving the positions of the pixels in the photographed image distortion process will be described. Certain coordinates in an image after the coordinate conversion through the distortion process are written as $(x_a, y_a)$ and coordinates before the distortion process, that is, before the coordinate conversion, are written as $(x_b, y_b)$. As a calculation result of pixel coordinates $(x_b, y_b)$ of a photographed image from new pixel coordinates $(x_a, y_a)$ after the coordinate conversion, the coordinates are assumed to correspond to a position between pixels among pixel coordinates of four points, as illustrated in FIG. 11. The pixel coordinates of the four points in the photographed image are notated as (u, v), (u+1, v) (u, v+1), and (u+1, v+1). Since there is no pixel value at the position of the pixel coordinates $(x_b, y_b)$ on the photographed image, a pixel value is calculated by performing a weighted averaging process using distances from the coordinates (u, v), (u+1, v) (u, v+1), and (u+1, v+1) of the surrounding four pixels by a linear interpolation method. As a result, the pixel value at the pixel coordinates $(x_b, y_b)$ is obtained as follows. When a pixel value of the coordinates (x, y) before the coordinate conversion is notated as "$F_b(x, y)$" and a pixel value of the coordinates (x, y) after the coordinate conversion is notated as "$F_a(x, y)$," the following expression is obtained.

$$F_a(x_b, y_b) = F_b(u, v) \cdot (1 - m) \cdot (1 - n) +$$
$$F_b(u + 1, v) \cdot m \cdot (1 - n) +$$
$$F_b(u, v + 1) \cdot (1 - m) \cdot n +$$
$$F_b(u + 1, v + 1) \cdot m \cdot n$$

In the above expression, the variable m represents a ratio when a line segment connecting two points indicated by the pixel coordinates (u, v) and (u+1, v) is internally divided at a ratio of "m:1−m" using the pixel coordinates (u, v) as a reference (where 0≤m≤1). The variable n represents a ratio when a line segment connecting two points indicated by the pixel coordinates (u, v) and (u, v+1) is internally divided at a ratio of "n:1−n" using the pixel coordinates (u, v) as a reference (where 0≤n≤1).

In this way, the pixel value $F_a(x_b, y_b)$ after the coordinate conversion is calculated through the linear interpolation method. In the embodiment, the calculation example of the pixel value in accordance with the linear interpolation method using four pixels surrounding a certain pixel has been described. The present invention is not limited thereto, but the coordinate conversion may be performed in accordance with a method using the pixel values of the closest lattice points to a point desired to be interpolated or another interpolation method without change.

Figure 8:
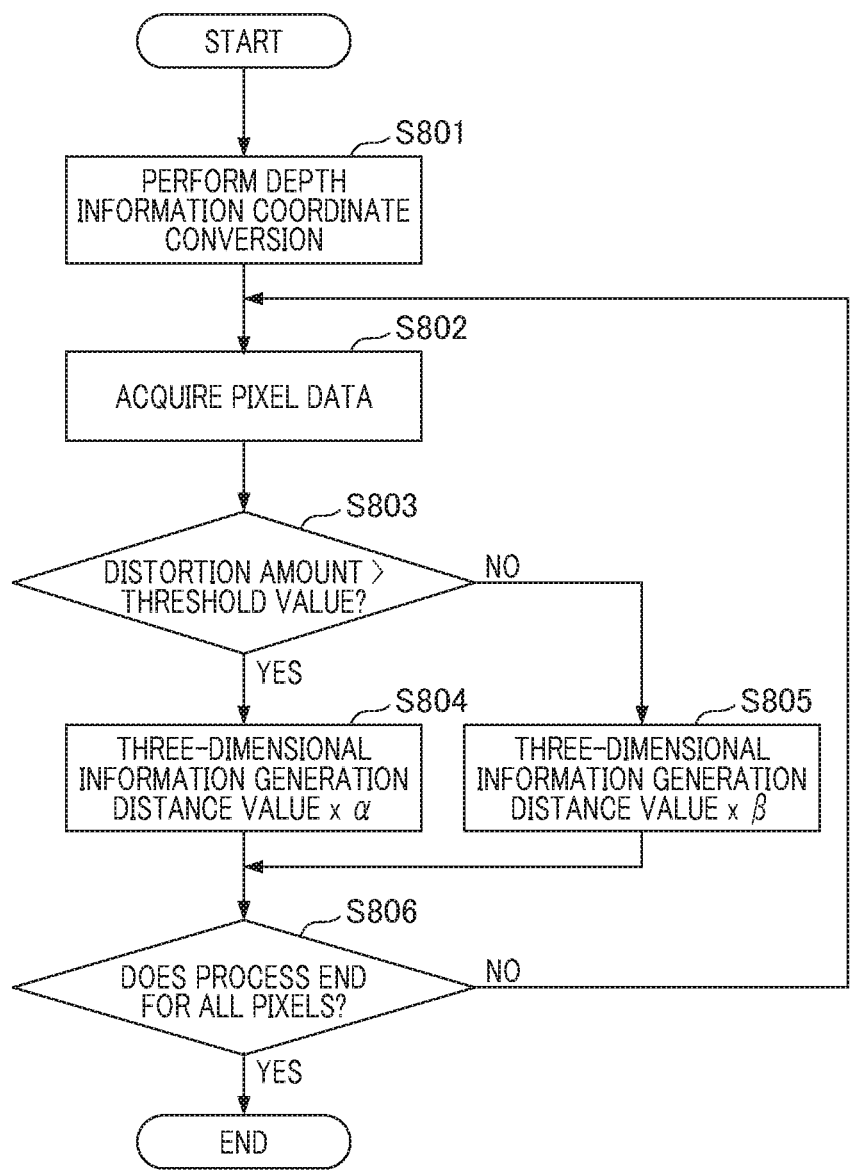
FIG. 8 is a flowchart illustrating a three-dimensional image data generation process according to a third embodiment.

In S204 of FIG. 2, the three-dimensional image data generation unit 112 generates the three-dimensional image data. The process of generating the three-dimensional image data will be described in detail with reference to FIG. 8.

In S801, the three-dimensional image data generation unit 112 performs the coordinate conversion even on the depth information stored in the DRAM 106, as in the case of the photographed image, in accordance with an instruction of the system control unit 101. The linear interpolation process by the distance value is also performed for the distance value as in the linear interpolation method described in S203, the pixels are associated with the pixels of the photographed image after the distortion process in one-to-one correspondence, and the depth information is changed. The depth information stored in the DRAM 106 is updated using the depth information after the conversion.

In S802, the three-dimensional image data generation unit 112 acquires the pixel data of each of the pixels sequentially selected in the photographed image obtained by performing the distortion process on the target image in accordance with an instruction of the system control unit 101. Further, the three-dimensional image data generation unit 112 acquires the distance value corresponding to the pixel positions of the pixels from the depth information stored in the DRAM 106.

S803 is a process of determining whether a distortion amount by the distortion process exceeds a threshold value in regard to the pixel data acquired in S802. In the embodiment, the generation coefficients are changed at an inclination of a change in the pixel movement amount in the image height direction of input and output of the distortion amount. When the inclination increases, the distortion amount is determined to exceed the threshold value. Specifically, in the case of the curved line in the distortion process of FIG. 9, the inclination of the distortion amount increases on a side (left side) on which the image height is low when an image height H901 is a reference. The inclination of the distortion amount decreases on a side (right side) on which the image height is higher than the image height H901. In the example of FIG. 10, the inside image portion surrounded by the dotted range L1001 is a region in which the inclination of the distortion amount increases. The image portion outside the dotted range L1001 is a region in which the inclination of the distortion amount decreases. When the pixel is determined to be a pixel in which the inclination of the distortion amount increases in S803, the process proceeds to S804. When the pixel is determined to be a pixel in which the inclination of the distortion amount decreases, the process proceeds to S805.

In S804, the three-dimensional image data generation unit 112 or the system control unit 101 performs the process of changing the depth information on the distance value of the pixels acquired in S801 so that assignment in the depth direction is greater. This process is performed by multiplying the distance value by the generation coefficient α, as in the first and second embodiments. In S805, the three-dimensional image data generation unit 112 or the system control unit 101 performs the process of changing the depth information on the distance value of the pixels acquired in S801 so that assignment in the depth direction is less. This process is performed by multiplying the distance value by the generation coefficient R, as in the first and second embodiments. After the process of S804 or S805, the three-dimensional image data generation unit 112 determines in S806 whether the process is performed on all of the pixels of the target image. When the process is not completed for all of the pixels, the process returns to S802 and the process is repeated. When the process is completed for all of the pixels, the process of generating the three-dimensional image data ends. Thereafter, the process of outputting the three-dimensional image data in S205 of FIG. 2 is performed.

According to the embodiment, when the fisheye-lens-like special effect processing of applying the effect in which the photographing is performed with a fisheye lens by distorting the image is performed to perform the three-dimensional expression, the effect is reflected like in the planar expression and the three-dimensional image can be output. Even when there is the restriction on the depth information in the apparatus outputting the three-dimensional image, the special effect can be efficiently expressed within the range of the restriction by causing the assignment amount to be greater in the depth direction of the image region in which the distortion amount exceeds the threshold value through the fisheye-lens-like special effect processing.

In the embodiment, the example in which the generation coefficient is changed according to the inclination of the change in the pixel movement amount in the image height direction has been described. The present invention is not limited thereto. The generation coefficient may be changed using a method in which assignment is reflected more in an image portion to which the effect of the distortion process is desired to be applied in the depth direction, for example, by changing the assignment ratio in the depth direction according to the magnitude of the distortion amount through the distortion process. The fisheye-lens-like special effect in which the distortion process is performed in the image height direction has been exemplified, but the present invention can be applied to various kinds of image processing with other coordinate conversion processes. For example, a process of changing the depth information (distance value) regarding an image according to a movement amount of the position of a pixel through the coordinate conversion process is performed, and an assignment amount in the depth direction is larger as the movement amount is larger.

According to the embodiments, it is possible to provide the image output apparatus capable of outputting a three-dimensional image or information for generating the three-dimensional image in which an image effect is reflected according to the kind of image processing (the special effect processing, the coordinate conversion process, or the like) among sizes in which the depth direction is restricted.

Although the digital camera has been described in the foregoing embodiments, the present invention can be applied to various apparatuses. For example, the invention can be embodied in the form of a program in an output apparatus such as a 3D printer outputting three-dimensional image data using image data and depth information regarding the image data as input information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-083229, filed Apr. 15, 2015, which is hereby incorporated by reference wherein in its entirety.

What is claimed is:

1. An image output apparatus that acquires two-dimensional image data and depth information regarding the image data and generates and outputs three-dimensional image data, the image output apparatus comprising:
   one or more processors; and
   at least one memory storing instructions which, when executed by the one or more processors, cause the image output apparatus to function as:
      an image processing unit configured to perform image processing on the image data;
      a generation unit configured to generate the three-dimensional image data from the image data subjected to the image processing by the image processing unit and the depth information; and
      a control unit configured to change the depth information according to the image processing performed by the image processing unit by weighting a distance value and perform control so that the generation unit generates the three-dimensional image data by using the changed depth information,
   wherein the image processing unit performs a contrast enhancement process on an image, and
   wherein the control unit changes the depth information according to a relative change in a luminance value through the contrast enhancement process.

2. The image output apparatus according to claim 1, wherein the control unit changes the depth information based on a kind of image processing performed on the image data by the image processing unit.

3. The image output apparatus according to claim 1, wherein the control unit changes the depth information based on a result obtained by analyzing the image data before and after the image processing is performed.

4. The image output apparatus according to claim 1, wherein the instructions, when executed by the one or more processors, further cause the image output apparatus to function as:
   a depth information generation unit configured to generate a distance map as the depth information from the image data.

5. The image output apparatus according to claim 1,
wherein the control unit changes the depth information by multiplying the distance value by a coefficient calculated from the luminance value before the contrast enhancement process is performed and the luminance value after the contrast enhancement process is performed.

6. The image output apparatus according to claim 1,
wherein the image processing unit performs a blurring process on an image, and
wherein the control unit performs different setting on the depth information between a region not subjected to the blurring process and a region subjected to the blurring process.

7. The image output apparatus according to claim 6,
wherein, with regard to the distance value for which a rear side in a depth direction of the image serves as a reference, the control unit sets the distance value such that the distance value in a region becomes smaller as a blurring amount by the blurring process becomes larger.

8. The image output apparatus according to claim 1,
wherein the image processing unit performs a coordinate conversion process of moving a position of a pixel in an image, and
wherein the control unit acquires a movement amount of the position of the pixel by the coordinate conversion process and changes the depth information.

9. The image output apparatus according to claim 1,
wherein the image processing unit performs a distortion process of distorting an image, and
wherein the control unit changes the depth information in accordance with a magnitude of a distortion amount by the distortion process or a degree of change in the distortion amount.

10. The image output apparatus according to claim 1,
wherein the image data is obtained based on an output from an imaging element including a plurality of pixels each receiving light fluxes passing through different pupil regions of an imaging optical system, and
wherein the depth information is acquired based on a defocus amount between pixel data output from the plurality of pixels.

11. The image output apparatus according to claim 1, wherein the instructions, when executed by the one or more processors, further cause the image output apparatus to function as:
a depth information generation unit configured to generate a distance map as the depth information from the image data.

12. An image output apparatus comprising:
one or more processors; and
at least one memory storing instructions which, when executed by the one or more processors, cause the image output apparatus to function as:
an acquisition unit configured to acquire two-dimensional image data and depth information regarding the image data;
an image processing unit configured to perform image processing on the image data;
a changing unit configured to change depth of the depth information according to the image processing performed by the image processing unit by weighting a depth; and
an output unit configured to output the image data subjected to the image processing by the image processing unit and the depth information changed by the changing unit in association with each other,
wherein the image processing unit performs a contrast enhancement process on an image, and
wherein the changing unit changes the depth information according to a relative change in a luminance value through the contrast enhancement process.

13. An image pickup apparatus comprising:
an image output apparatus that acquires two-dimensional image data and depth information regarding the image data and generates and outputs three-dimensional image data; and
an imaging unit configured to image a subject,
wherein the image output apparatus comprises:
one or more processors, and
at least one memory storing instructions which, when executed by the one or more processors, cause the image output apparatus to function as:
an image processing unit configured to perform image processing on the image data;
a generation unit configured to generate the three-dimensional image data from the image data subjected to the image processing by the image processing unit and the depth information; and
a control unit configured to change the depth information according to the image processing performed by the image processing unit by weighting a distance value and perform control so that the generation unit generates the three-dimensional image data by using the changed depth information,
wherein the image processing unit performs a contrast enhancement process on an image, and
wherein the control unit changes the depth information according to a relative change in a luminance value through the contrast enhancement process.

14. The image pickup apparatus according to claim 13,
wherein the imaging unit comprises a plurality of pixels each receiving light fluxes passing through different pupil regions of an imaging optical system, and
wherein the depth information is acquired based on a defocus amount between pixel data output from the plurality of pixels.

15. A control method that is executed by an image output apparatus acquiring two-dimensional image data and depth information regarding the image data and generating and outputting three-dimensional image data, the method comprising:
performing image processing on the image data;
changing the depth information according to the image processing performed in the performing by weighting a distance value; and
generating the three-dimensional image data by using the image data subjected to the image processing in the performing and the depth information changed in the changing,
wherein, in the performing, a contrast enhancement process is performed on an image, and
wherein, in the changing, the depth information is changed according to a relative change in a luminance value through the contrast enhancement process.

16. A non-transitory storage medium on which is stored a computer program for making a computer execute a control method that is executed by an image output apparatus acquiring two-dimensional image data and depth information regarding the image data and generating and outputting three-dimensional image data, the method comprising:

performing image processing on the image data;
changing the depth information according to the image processing performed in the performing by weighting a distance value; and
generating the three-dimensional image data by using the image data subjected to the image processing in the performing and the depth information changed in the changing,
wherein, in the performing, a contrast enhancement process is performed on an image, and
wherein, in the changing, the depth information is changed according to a relative change in a luminance value through the contrast enhancement process.

17. An image output apparatus that acquires two-dimensional image data and depth information regarding the image data and generates and outputs three-dimensional image data, the image output apparatus comprising:
one or more processors; and
at least one memory storing instructions which, when executed by the one or more processors, cause the image output apparatus to function as:
an image processing unit configured to perform image processing on the image data;
a generation unit configured to generate the three-dimensional image data from the image data subjected to the image processing by the image processing unit and the depth information; and
a control unit configured to change the depth information according to the image processing performed by the image processing unit by weighting a distance value and perform control so that the generation unit generates the three-dimensional image data by using the changed depth information,
wherein the image processing unit performs a blurring process on an image, and
wherein the control unit sets the distance value such that the distance value in a region not subject to the blurring process becomes smaller than the distance in a region subject to the blurring process.

18. The image output apparatus according to claim 17, wherein the control unit sets the distance value such that the distance value in a region becomes smaller as a blurring amount by the blurring process becomes larger.

19. The image output apparatus according to claim 17, wherein the control unit changes the depth information based on a result obtained by analyzing the image data before and after the image processing is performed.

20. The image output apparatus according to claim 17, wherein the image processing unit performs a coordinate conversion process of moving a position of a pixel in an image, and
wherein the control unit acquires a movement amount of the position of the pixel by the coordinate conversion process and changes the depth information.

21. The image output apparatus according to claim 17, wherein the image processing unit performs a distortion process of distorting an image, and
wherein the control unit changes the depth information in accordance with a magnitude of a distortion amount by the distortion process or a degree of change in the distortion amount.

22. The image output apparatus according to claim 17, wherein the image data is obtained based on an output from an imaging element including a plurality of pixels each receiving light fluxes passing through different pupil regions of an imaging optical system, and
wherein the depth information is acquired based on a defocus amount between pixel data output from the plurality of pixels.

23. An image pickup apparatus comprising:
an image output apparatus that acquires two-dimensional image data and depth information regarding the image data and generates and outputs three-dimensional image data; and
an imaging unit configured to image a subject,
wherein the image output apparatus comprises:
one or more processors; and
at least one memory storing instructions which, when executed by the one or more processors, cause the image output apparatus to function as:
an image processing unit configured to perform image processing on the image data;
a generation unit configured to generate the three-dimensional image data from the image data subjected to the image processing by the image processing unit and the depth information; and
a control unit configured to change the depth information according to the image processing performed by the image processing unit by weighting a distance value and perform control so that the generation unit generates the three-dimensional image data by using the changed depth information,
wherein the image processing unit performs a blurring process on an image, and
wherein the control unit sets the distance value such that the distance value in a region not subject to the blurring process becomes smaller than the distance value in a region subject to the blurring process.

24. A control method that is executed by an image output apparatus acquiring two-dimensional image data and depth information regarding the image data and generating and outputting three-dimensional image data, the method comprising:
performing image processing on the image data;
changing the depth information according to the image processing performed in the performing by weighting a distance value; and
generating the three-dimensional image data by using the image data subjected to the image processing in the performing and the depth information changed in the changing,
wherein, in the performing, a blurring process is performed on an image, and
wherein the distance value is set such that the distance value in a region not subject to the blurring process becomes smaller than the distance value in a region subject to the blurring process.

25. A non-transitory storage medium on which is stored a computer program for making a computer execute a control method that is executed by an image output apparatus acquiring two-dimensional image data and depth information regarding the image data and generating and outputting three-dimensional image data, the method comprising:
performing image processing on the image data;
changing the depth information according to the image processing performed in the performing by weighting a distance value; and
generating the three-dimensional image data by using the image data subjected to the image processing in the performing and the depth information changed in the changing, wherein, in the performing, a blurring process is performed on an image, and wherein the control unit sets the distance value such that the distance value in a region not subject to the blurring process becomes smaller than the distance value in a region subject to the blurring process.

26. An image output apparatus that acquires two-dimensional image data and depth information regarding the image data and generates and outputs three-dimensional image data, the image output apparatus comprising:

one or more processors; and at least one memory storing instructions which, when executed by the one or more processors, cause the image output apparatus to function as:

an image processing unit configured to perform image processing on the image data;

a generation unit configured to generate the three-dimensional image data from the image data subjected to the image processing by the image processing unit and the depth information; and a control unit configured to change the depth information according to the image processing performed by the image processing unit and perform control so that the generation unit generates the three-dimensional image data by using the changed depth information, wherein the image processing unit performs a blurring process on an image, and wherein the control unit changes the depth information such that assignment amount in a depth direction in a region not subject to the blurring process is more, and assignment amount in the depth direction in a region subject to the depth information is less.

* * * * *